(12) United States Patent
Brodeck

(10) Patent No.: US 8,887,682 B2
(45) Date of Patent: Nov. 18, 2014

(54) LOW FRICTION CAMSHAFT

(71) Applicant: Mahle Internartional GmbH, Stuttgart (DE)

(72) Inventor: Luke Brodeck, Brighton, MI (US)

(73) Assignee: Mahle International GmbH (DE)

( * ) Notice: Subject to any disclaimer, the term of this patent is extended or adjusted under 35 U.S.C. 154(b) by 50 days.

(21) Appl. No.: 13/711,075

(22) Filed: Dec. 11, 2012

(65) Prior Publication Data

US 2014/0158076 A1 Jun. 12, 2014

(51) Int. Cl.
*F01L 1/047* (2006.01)
*F01L 1/053* (2006.01)

(52) U.S. Cl.
CPC ................... *F01L 1/0532* (2013.01)
USPC ....................... 123/90.6; 123/90.27

(58) Field of Classification Search
CPC ............ F01L 1/047; F01L 1/053; F01L 1/34; F01L 2820/041; F91L 2001/0537
USPC ................................. 123/90.6, 90.27
See application file for complete search history.

(56) References Cited

U.S. PATENT DOCUMENTS

2004/0244528 A1* 12/2004 Meusburger et al. ........... 74/567
2009/0235887 A1* 9/2009 Oishi et al. ................. 123/90.38

* cited by examiner

*Primary Examiner* — Zelalem Eshete
(74) *Attorney, Agent, or Firm* — Rader, Fishman & Grauer PLLC

(57) ABSTRACT

A camshaft may include a shaft with journals that have outer surfaces with a common outer diameter for carrying cages and roller bearings, such as low-friction needle roller bearings, to provide a uniform rolling speed of the rolling members axially along the camshaft.

19 Claims, 7 Drawing Sheets

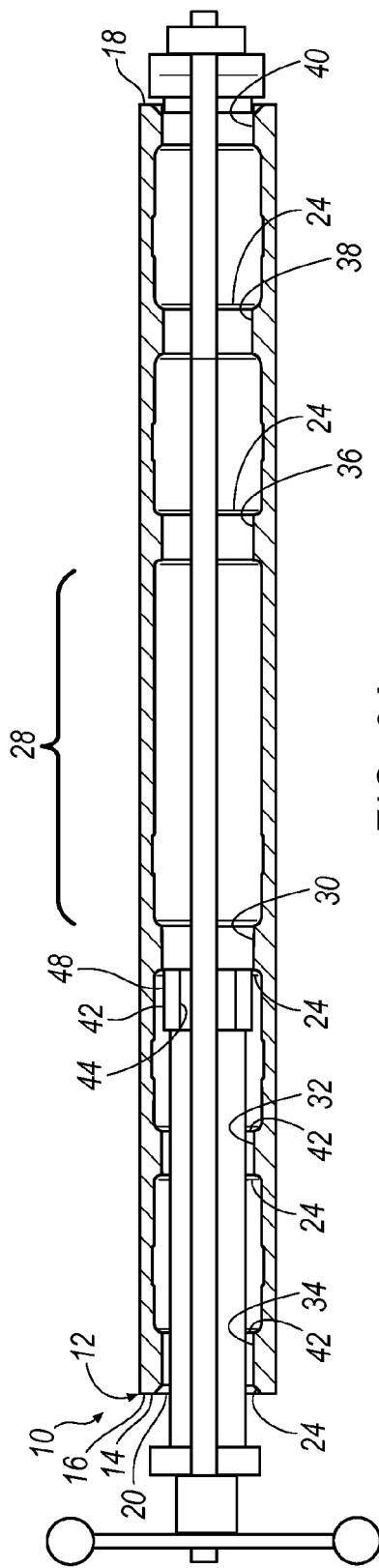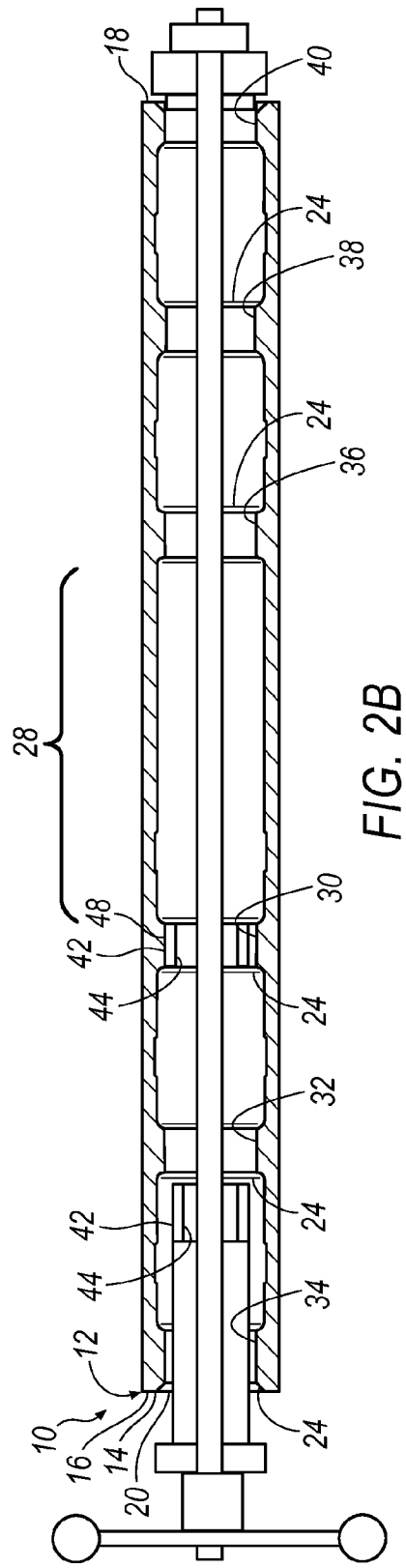

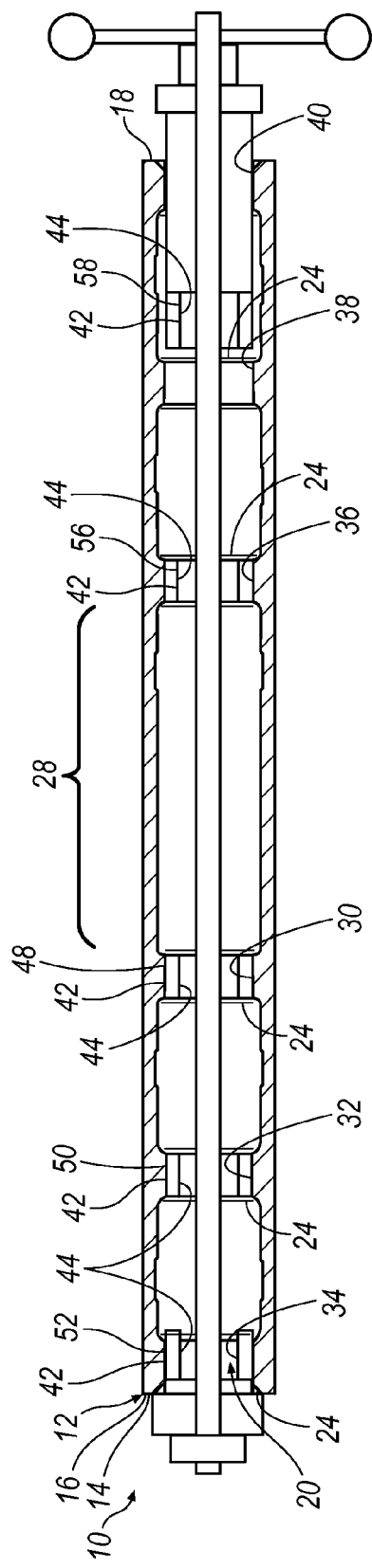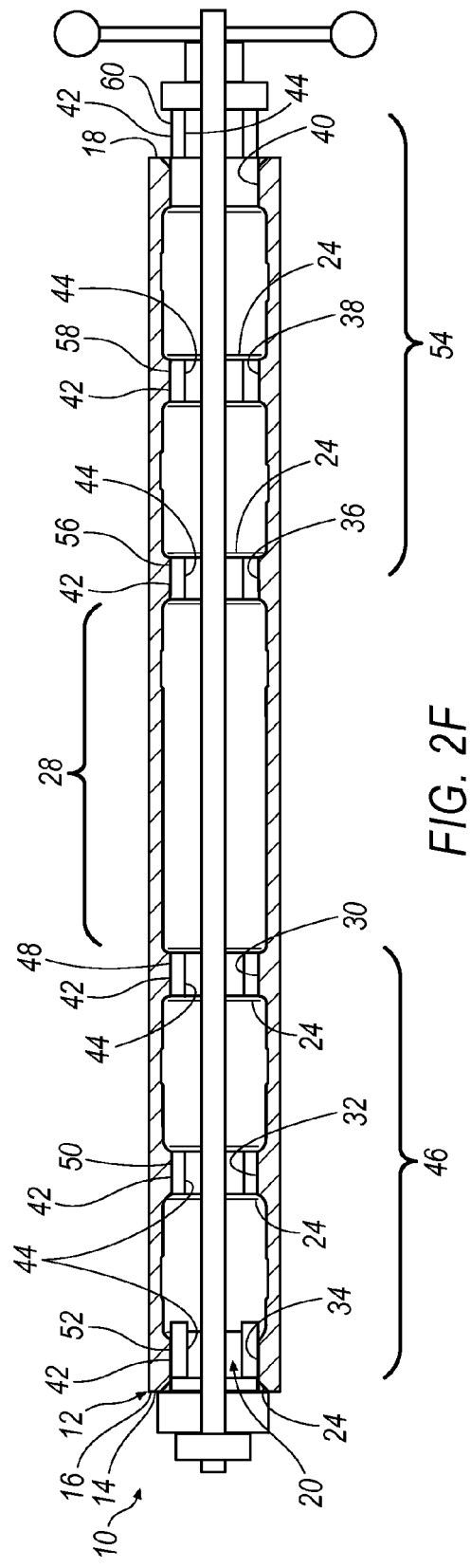

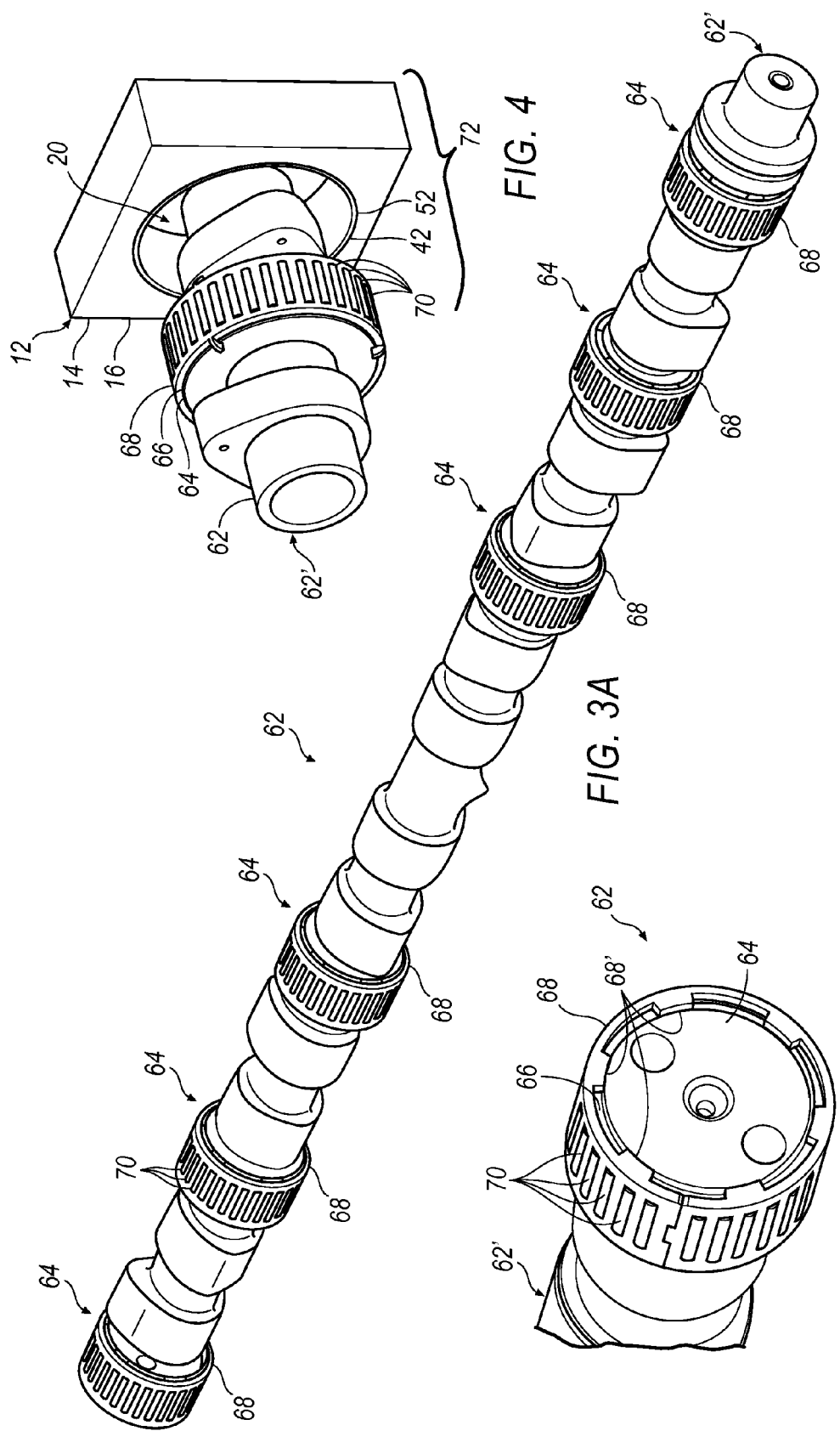

US 8,887,682 B2

LOW FRICTION CAMSHAFT

BACKGROUND

Internal combustion engine manufacturers are constantly investigating ways to improve the fuel efficiency of their products, as well as the methods for manufacturing the same. One method to improve fuel efficiency is to reduce friction losses associated with the camshaft. To implement low friction camshaft technology with a tunnel bearing camshaft design, outer races need to be installed in the cylinder block or cylinder head from either only a front side or only a rear side of the engine. This method of installation may be somewhat difficult in many applications due limited access to the journal locations within the engine. Some low friction camshaft assemblies may include camshafts having journals of various outer diameters, which may increase the rolling speed of the roller bearings on the journal having the largest outer diameter thus adversely affecting the durability and performance of the camshaft.

Accordingly, there is a need for a camshaft and method for installing the same in an engine, which enables low friction technology to improve the fuel efficiency of the engine, maintain performance of the camshaft and provide ease of manufacture.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows:

FIG. 2A is a cross-sectional view of the stepped bore of FIG. 1, illustrating installation of a first outer race on a first journal section;

FIG. 2B is a cross-sectional view of the stepped bore of FIG. 1, illustrating installation of a second outer race on a second journal section;

FIG. 2E is a cross-sectional view of the stepped bore of FIG. 1, illustrating installation of a fifth outer race on a fifth journal section;

FIG. 2F is a cross-sectional view of the stepped bore of FIG. 1, illustrating installation of a sixth outer race on a sixth journal section;

FIG. 3A is a perspective view of an exemplary camshaft for the engine of FIG. 1;

FIG. 3B is an enlarged view of a portion of the camshaft of FIG. 3A;

FIG. 4 is a partial view of a portion of the engine of FIG. 1 with a portion of the camshaft of FIG. 3A being installed therein;

DETAILED DESCRIPTION

Figure 1:
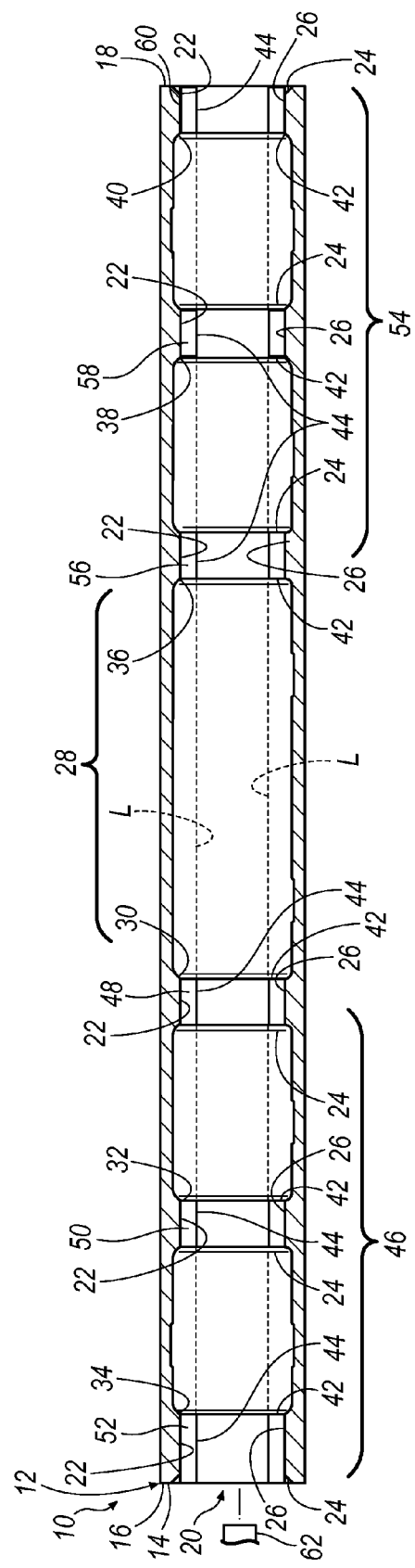
FIG. 1 is a cross-sectional view of a portion of an engine that defines a stepped bore to permit installation of a first group of outer races from a front side of the engine and installation of a second group of outer races from a rear side of the engine.
Figure 2C:
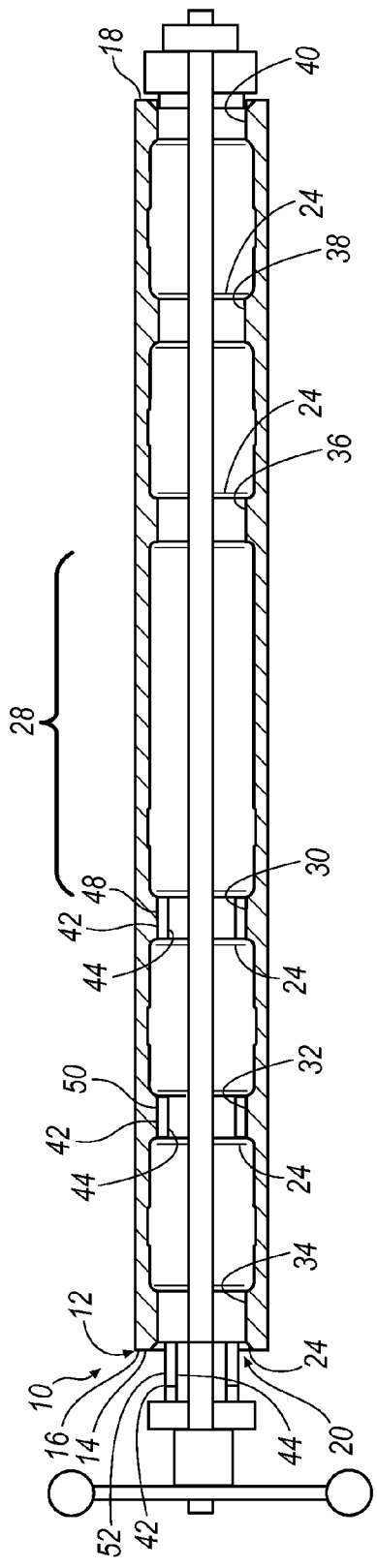
FIG. 2C is a cross-sectional view of the stepped bore of FIG. 1, illustrating installation of a third outer race on a third journal section.
Figure 2D:
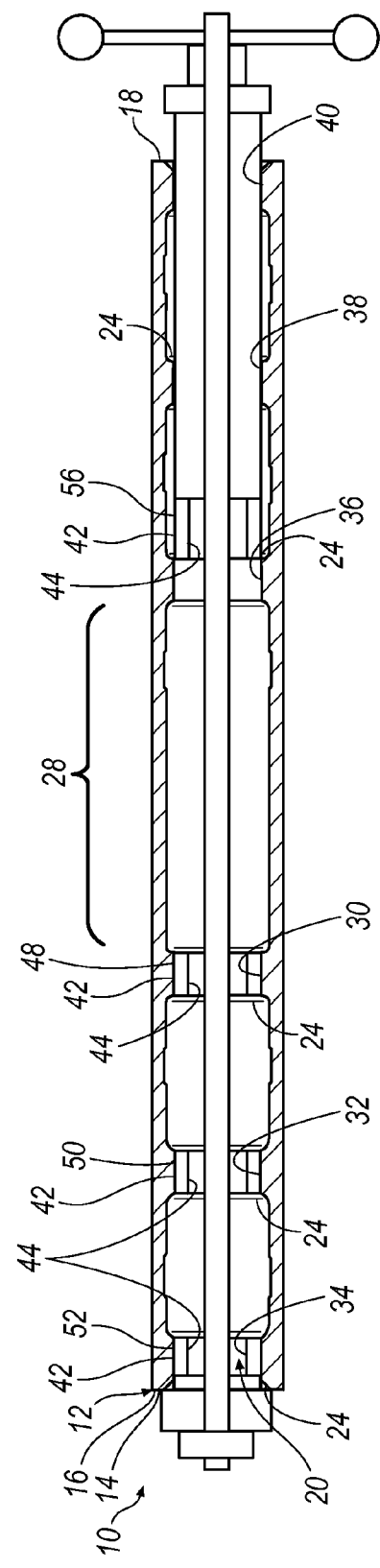
FIG. 2D is a cross-sectional view of the stepped bore of FIG. 1, illustrating installation of a fourth outer race on a fourth journal section.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

An exemplary camshaft (best shown in FIGS. 3A, 3B, 4 and 6) may include a shaft with journals that have outer surfaces with a common outer diameter for carrying cages and roller bearings, such as low-friction needle roller bearings, to provide a uniform rolling speed of the rolling members axially along the camshaft. The camshaft may be installed in engines having various stepped bore configurations by utilizing outer races corresponding with the stepped bore, such that the outer races have a common inner diameter aligned with one another along the bore. The exemplary camshaft illustrated in the figures is configured for a 6-cylinder engine. However, the camshaft may be configured for an engine having two or more cylinders.

Referring now to FIG. 1, an engine 10 may have an engine body 12 in the form of a cylinder block 14. The cylinder block 14 may have a front side 16, a rear side 18 and a stepped bore 20 extending between the front and rear sides.

The stepped bore 20 may be formed at least in part by a plurality of spaced apart journal portions 22 having chamfered edges 24 and a plurality of inner diameters 26, which decrease from the front and rear sides toward a central position 28 axially along the stepped bore 20 to provide clearance for installing outer races therein as described below.

The journal portions 22 may have inner diameters that incrementally increase from the central position of the bore toward the front and rear sides. In particular, the journal portions include a first journal portion 30, which has a first inner diameter and may be disposed proximal to the central position 28 axially along the stepped bore. The journal portions 22 may further include a second journal portion 32 disposed between the first journal portion 30 and the front side 16, and the second journal portion 32 may have a second inner diameter that is larger than the first inner diameter. In addition, the journal portions 22 may also include a third journal portion 34 disposed between the second journal portion 32 and the front side 16, and the third journal portion 34 may have a third inner diameter that is larger than the second inner diameter. In this example, the third journal portion 34 may be disposed adjacent to the front side 16. Moreover, the journal portions 22 may further include a fourth journal portion 36 disposed proximal to the central position 28 axially along the stepped bore between the first journal portion 30 and the rear side 18. The fourth journal portion 36 may have a fourth inner diameter. The journal portions 22 may also include a fifth journal portion 38 disposed between the fourth journal portion 36 and the rear side 18, and the fifth journal portion 38 may have a fifth inner diameter that is larger than the fourth inner diameter. Further, the journal portions 22 may also include a sixth journal portion 40 disposed between the fifth journal portion 38 and the rear side 18, and the sixth journal portion 40 may have a sixth inner diameter that is larger than the fifth inner diameter. In this example, the sixth journal portion 40 may be disposed adjacent to the rear side 18. To permit the system to have common parts and reduced related costs, the first and fourth inner diameters may be equal to one another; the second and fourth inner diameters may be equal to one another; and the third and sixth inner diameters may be equal to each other. However, the inner diameters can be equal or not equal to one another in various suitable ways.

Referring to FIGS. 1 and 2A-2F, the engine 10 may further include a plurality of outer races 42 mounted in the journal portions 22. The outer races 42 may have a plurality of inner surfaces 44 with a common inner diameter.

As best shown in FIGS. 1 and 2F, the outer races 42 may include a first group of outer races 46 inserted into the stepped bore 20 from the front side 16. This first group 46 may include a first outer race 48, a second outer race 50 and a third outer race 52, which are press-fitted, installed or mounted in a respective one of the first journal portion 30, the second journal portion 32 and the third journal portion 34.

The outer races 42 may further include a second group of outer races 54 inserted into the stepped bore from the rear side 18. This second group 54 may include a fourth outer race 56, a fifth outer race 58 and a sixth outer race 60, which are press-fitted, installed or mounted in a respective one of the fourth journal portion 36, the fifth journal portion 38 and the sixth journal portion 40.

The outer races 42 may have a plurality of thicknesses corresponding with the stepped bore 20 to align the inner surfaces 44 of the outer races with one another along the stepped bore, as illustrated by lines L. In this example, the thicknesses of the outer races may incrementally decrease from the front and rear sides toward the central position to provide clearance for installing the outer races in respective journal portions and align the inner surfaces 44 of the outer races 42 with one another along the stepped bore 20. Further, to permit the system to have common parts and lower the cost of manufacture, the first and fourth races may have an equal thickness; the second and fifth races may have an equal thickness greater than that of the first and fourth races; and the third and sixth races may have an equal thickness greater than that of the second and fifth races. In addition, the engine may have more or less than six outer races in one group and inserted into the bore from only the front side or only the rear side, and the outer races may be divided into two groups of an equal or unequal number of outer races.

Referring to FIGS. 3A, 3B and 4, a camshaft 62 including a shaft 62', which has a plurality of journals 64 having outer surfaces 66 with a common outer diameter, may be installed in the engine 10. In this respect, as best shown in FIG. 3B, the outer surfaces 66 may carry a plurality of cages 68 and roller bearings 70 that correspond with a respective one of the inner surfaces of the outer races to form a plurality of bearing assemblies that rotatably mount the camshaft 62 to the cylinder block 14 and provide a uniform rolling speed of the rolling members thereby improving the durability of the camshaft and optimizing its overall performance. The cages 68 may have a plurality of alignment tabs 68' (FIG. 3B) for fastening the cages 68 to a respective one of the journals 64 in their respective fixed positions along an axial direction of the camshaft. However, other suitable detents and alignment methods may attach the cages to the journals. Further, the roller bearings are needle bearings; however, they may be other low-friction bearing members.

Figure 5:
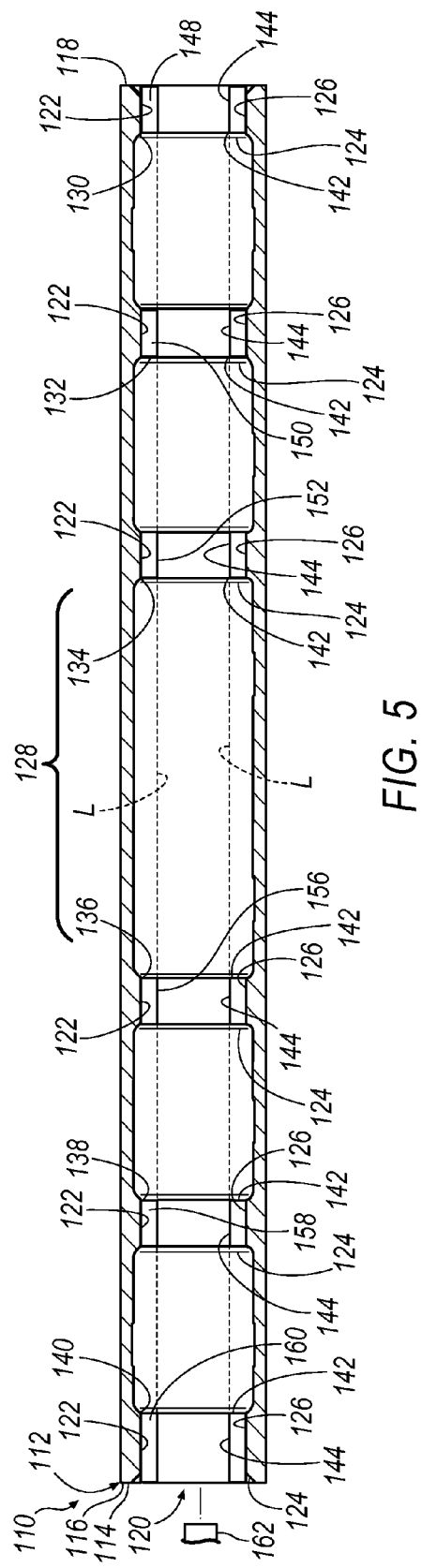
FIG. 5 is a cross-sectional view of a portion of an engine that defines a stepped bore permitting installation of all bearing assemblies from the front side of the engine.

Referring to FIG. 5, there is depicted a portion of another engine 110 in which a camshaft 162 may be installed. This engine 110 may include an engine body 112 in the form of a cylinder head 114, rather than a cylinder block. The cylinder head 114 may have a front side 116, a rear side 118 and a stepped bore 120 extending between the front and rear sides. The stepped bore 120 may be formed at least in part by a plurality of spaced apart journal portions 122 that have chamfered edges 124 and a plurality of inner diameters 126 that decrease from the front side 116 to the rear side 118 axially along the stepped bore 120 to provide clearance for installing outer races therein as described below. However, the inner diameters may decrease from the rear side to the front side to permit installation from the rear side.

In this example, the journal portions 122 may include a first journal portion 130, which has a first inner diameter and is disposed proximal to the rear side 118 axially along the stepped bore. The journal portions 122 may further include a second journal portion 132 disposed between the first journal portion 130 and the front side 116, and the second journal portion 132 may have a second inner diameter that is larger than the first inner diameter. In addition, the journal portions 122 may also include a third journal portion 134 disposed between the second journal portion 132 and the front side 116, and the third journal portion 134 may have a third inner diameter that is larger than the second inner diameter. Moreover, the journal portions 122 may include a fourth journal portion 136 disposed between the third journal portion 134 and the front side 116, and the fourth journal portion 136 may have a fourth inner diameter that is larger than the third inner diameter. The journal portions 122 may also include a fifth journal portion 138 disposed between the fourth journal portion 136 and the front side 116, and the fifth journal portion 138 may have a fifth inner diameter that is larger than the fourth inner diameter. Further, the journal portions 122 may also include a sixth journal portion 140 disposed between the fifth journal portion 138 and the front side 116, and the sixth journal portion 140 may have a sixth inner diameter that is larger than the fifth inner diameter. The engine may instead include more or less than six journal portions with respective inner diameters that provide a stepped configuration of the bore.

The engine 110 may have a plurality of outer races 142 mounted in the journal portions 122. The outer races 142 may include a plurality of inner surfaces 144 with a common inner diameter. These outer races 142 may be inserted into the stepped bore 120 from the front side 116. In this example, the outer races 142 may include a first outer race 148, a second outer race 150, a third outer race 152, a fourth outer race 156, a fifth outer race 158 and a sixth outer race 160, which are press-fitted, installed or mounted in a respective one of the first journal portion 130, the second journal portion 132, the third journal portion 134, the fourth journal portion 136, the fifth journal portion 138 and the sixth journal portion 140. The outer races 142 may have a plurality of thicknesses corresponding with the stepped bore 120 to align the inner surfaces 144 of the outer races with one another along the stepped bore, as depicted by lines L. In this example, the thicknesses of the outer races may decrease from the front side 116 toward the rear side 118. However, the thicknesses may instead decrease from the rear side toward the front side to permit installation from the rear side, when the inner diameters of the journal portions decrease from the rear side to the front side. Further, the engine may have more or less than six outer races to correspond with the number of journal portions in the bore.

Figure 6:
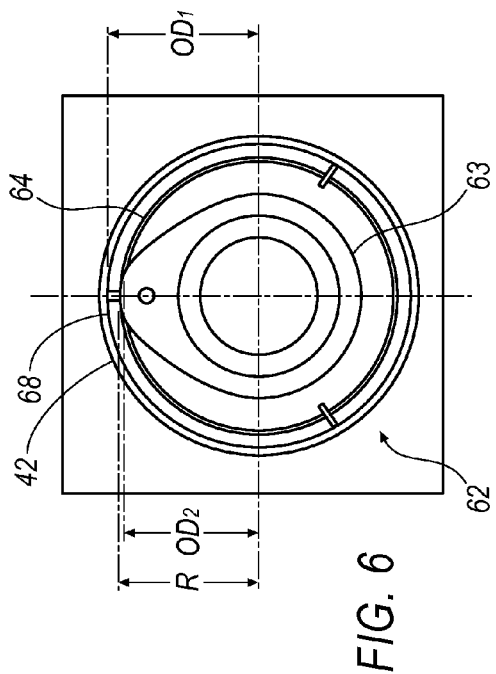
FIG. 6 is an end view of an exemplary camshaft for the engine of FIG. 1.

Referring to FIG. 6, the camshaft 62 includes a functional element, such as a cam lobe 63, having a maximum radial extension R that is less than an outer diameter OD1 of the cages 68 carried on the journals 64. Further, the common outer diameter OD2 of the journals 64 is less than the maximum radial extension R.

Figure 7:
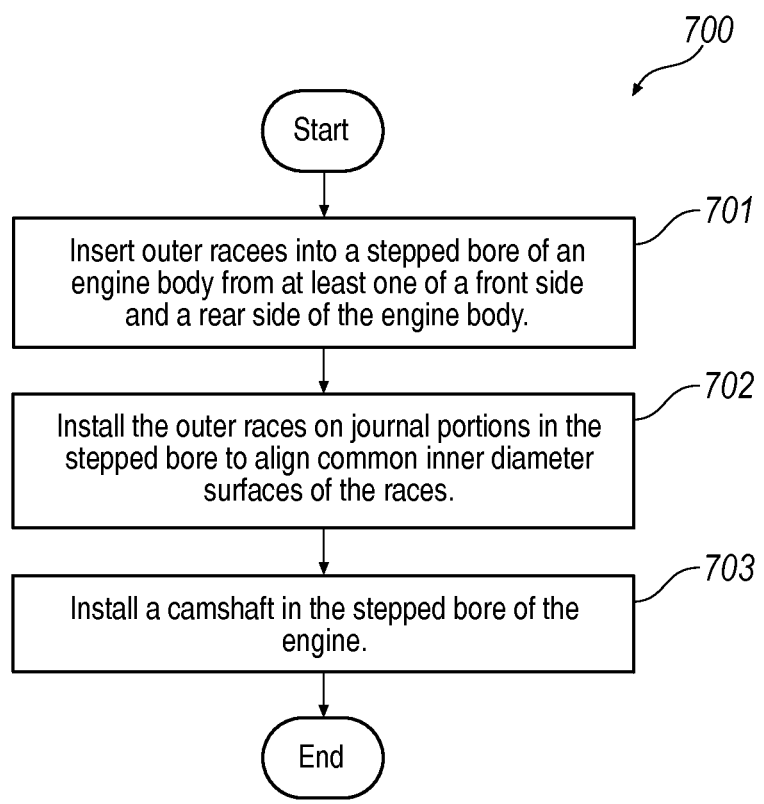
FIG. 7 is a flow chart for of an exemplary process of installing a camshaft in a stepped bore of an engine body.

Referring to FIG. 7, an exemplary process 700 for installing a low-friction camshaft begins with step 701. In step 701, a plurality of outer races may be inserted into a stepped bore of an engine body from at least one of a front side and a rear side of the engine body, such as a cylinder block or a cylinder head. For example, first, second and third outer races may be inserted into the stepped bore from the front side. Further, fourth, fifth and sixth outer races may be inserted into the stepped bore from the rear side of the engine body. Of course, more or less than three outer races can be inserted into the bore on either side of the engine body. By way of another example, all outer races may be inserted into the bore from only the front side or only the rear side of the engine body. The process then proceeds to step 702.

In step 702, the plurality of outer races may be installed on a plurality of journal portions in the stepped bore to align common inner diameter surfaces of the races. For example, the first outer race may be installed on a first journal portion, which may have a first inner diameter and be disposed proximal to a central position axially along the stepped bore. The second outer race may be installed on a second journal portion disposed between the first journal portion and the front side, and the second journal portion may have a second inner diameter that is larger than the first inner diameter. The third outer race may be installed on a third journal portion disposed between the second journal portion and the front side, and the third journal portion may have a third inner diameter that is larger than the second inner diameter. The fourth outer race may be installed on a fourth journal portion disposed proximal to the central position axially along the stepped bore and between the first journal portion and the rear side, and the fourth journal portion may have a fourth inner diameter. The fifth outer race may be installed on a fifth journal portion disposed between the fourth journal portion and the rear side, and the fifth journal portion may have a fifth inner diameter that is larger than the fourth inner diameter. The sixth outer race may be installed on a sixth journal portion disposed between the fifth journal portion and the rear side, and the sixth journal portion may have a sixth inner diameter that is larger than the fifth inner diameter. These outer races may be separately and sequentially installed on their respective journal portions. However, tooling may be used to install any two or more of the outer races simultaneously. In this exemplary embodiment, to permit the system to have common parts and reduced related costs, the first and fourth inner diameters may be equal to one another; the second and fourth inner diameters may be equal to one another; and the third and sixth inner diameters may be equal to each other. Further, the first and fourth races may have an equal thickness; the second and fifth races may have an equal thickness greater than that of the first and fourth races; and the third and sixth races may have an equal thickness greater than that of the second and fifth races, so as to provide common parts and lower costs of manufacture. The process then proceeds to step 703.

In step 703, a camshaft including a plurality of journals, which in turn may have outer surfaces with a common outer diameter for carrying respective cages and roller members, may be installed within the stepped bore of the engine. In particular, the camshaft may be installed within the stepped bore by corresponding the cages with a respective one of the outer races to form a plurality of bearing assemblies that rotatably mounts the camshaft to the engine body. In this respect, the roller bearings may have a uniform rolling speed so as to improve the durability of the shaft and optimize the overall performance of the camshaft. In this example, the roller bearing assemblies may be needle bearing assemblies but may instead be other suitable roller bearing assemblies. After step 703, the process may terminate. Of course, however, the process may include additional steps and/or omit any of the above steps to install the low-friction camshaft in the engine.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A camshaft, comprising:
a shaft with a plurality of journals that have a plurality of outer surfaces with a common outer diameter for carrying a plurality of cages and a plurality of roller bearings to provide a uniform rolling speed of the plurality of rolling members axially along the camshaft;
wherein the shaft is configured to engage a plurality of races that have a plurality of thicknesses and a plurality of inner surfaces with a common inner diameter, and the plurality of races are installed in a stepped bore of an engine body so as to align the inner surfaces along the stepped bore.

2. The camshaft of claim 1 wherein the plurality of cages and the plurality of roller bearings are a plurality of needle bearings.

3. The camshaft of claim 1 wherein at least a first group of races are inserted into the stepped bore from one of a front side and a rear side of the engine body and a second group of races are inserted into the stepped bore from the other of the front and rear sides.

4. The camshaft of claim 1 wherein the stepped bore is formed from a plurality of spaced apart journal portions having a plurality of inner diameters that decrease from one of a front side and a rear side of the engine body toward a central position axially along the stepped bore, and the inner diameters have the races mounted therein.

5. The camshaft of claim 4 wherein the plurality of thicknesses of the races decreases from the front and rear sides toward the central position to align the inner surfaces of the races along the stepped bore.

6. The camshaft of claim 1, wherein the stepped bore is formed from a plurality of spaced apart journal portions comprising:
a first journal portion having a first inner diameter and disposed proximal to the central position axially along the stepped bore;
a second journal portion disposed between the first journal portion and a front side of the engine body, and the second journal portion has a second inner diameter that is larger than the first inner diameter;
a third journal portion disposed between the second journal portion and the front side, and the third journal portion has a third inner diameter that is larger than the second inner diameter;
a fourth journal portion disposed proximal to the central position axially along the stepped bore between the first journal portion and a rear side of the engine body, and the fourth journal portion has a fourth inner diameter;
a fifth journal portion disposed between the fourth journal portion and the rear side, and the fifth journal portion has a fifth inner diameter that is larger than the fourth inner diameter; and
a sixth journal portion disposed between the fifth journal portion and the rear side, and the sixth journal portion has a sixth inner diameter that is larger than the fifth inner diameter.

7. The camshaft of claim 6 wherein the first and fourth inner diameters are equal to each other, the second and fifth inner diameters are equal to each other, and the third and sixth inner diameters are equal to each other.

8. The camshaft of claim 6, wherein the plurality of races comprises:
first, second and third races that are inserted into the stepped bore from the front side of the engine block and installed on a respective one of the first, second and third journal portions; and
fourth, fifth and sixth races that are inserted into the stepped bore from the rear side of the engine block and installed on a respective one of the fourth, fifth and sixth journal portions;
wherein the first and fourth races have an equal thickness, the second and fifth races have an equal thickness greater than that of the first and fourth races, and the third and sixth races have an equal thickness greater than that of the second and fifth races.

9. The camshaft of claim 1 wherein the plurality of outer races is inserted into the stepped bore from one of a front side of the engine body and a rear side of the engine body.

10. The camshaft of claim 1 wherein the stepped bore is formed from a plurality of spaced apart journal portions having a plurality of inner diameters that decrease from one of a front side and a rear side of an engine body to the other of the front and rear sides, and the inner diameters have the races mounted therein.

11. The camshaft of claim 10 wherein the plurality of thicknesses of the races decreases from one of the front and rear sides to the other of the front and rear sides to align the inner surfaces of the races along the stepped bore.

12. The camshaft of claim 1, wherein the stepped bore is formed from a plurality of spaced apart journal portions comprising:
a first journal portion having a first inner diameter and disposed proximal to one of a front side of the engine body and a rear side of the engine body and;
a second journal portion disposed between the first journal portion and the other of the front and rear sides, and the second journal portion has a second inner diameter that is larger than the first inner diameter; and
a third journal portion disposed between the second journal portion and the other of the front and rear sides, and the third journal portion has a third inner diameter that is larger than the second inner diameter;
a fourth journal portion disposed between the third journal position and the other of the front and rear sides, and the fourth journal portion has a fourth inner diameter that is larger than the third inner diameter;
a fifth journal portion disposed between the fourth journal portion and the other of the front and rear sides, and the fifth journal portion has a fifth inner diameter that is larger than the fourth inner diameter; and
a sixth journal portion disposed between the fifth journal portion and the other of the front and rear sides, and the sixth journal portion has a sixth inner diameter that is larger than the fifth inner diameter.

13. The camshaft of claim 12, wherein the plurality of races comprises first, second, third, fourth, fifth and sixth races inserted into the stepped bore from one of the front and rear sides and installed on a respective one of the first, second, third, fourth, fifth and sixth journal portions.

14. The camshaft of claim 1 wherein the plurality of cages have a plurality of alignment tabs for fastening the cages to a respective one of the journals in respective fixed positions along an axial direction.

15. The camshaft of claim 1, wherein the stepped bore is formed from a plurality of journal portions having a plurality of chamfered edges to facilitate installation of the plurality of races.

16. The camshaft of claim 1 wherein the shaft further includes at least one of a cam lobe and a functional element having a maximum radial extension that is less than an outer diameter of the cages carried on the journals, and the common outer diameter of the journals is less than the maximum radial extension.

17. A method for installing a low-friction cam shaft, comprising:
inserting a plurality of races of a first plurality of bearing assemblies into a stepped bore of an engine body from at least one of a front side and a rear side of the engine body, and the plurality of races have a plurality of thicknesses and a plurality of inner surfaces with a common inner diameter;
installing the plurality of races on a plurality of journal portions in the stepped bore, such that the inner surfaces of the races are aligned along the stepped bore; and
installing a camshaft having a plurality of journals that carry a plurality of cages and a plurality of roller members corresponding with the plurality of races to form a plurality of bearing assemblies that rotatably mounts the camshaft to the engine body.

18. The method of claim 17, further comprising:
inserting first, second and third races into the stepped bore from the front side of the engine body;

installing the first race on a first journal portion that has a first inner diameter and is disposed proximal to a central position axially along the stepped bore;

installing the second race on a second journal portion disposed between the first journal portion and the front side, and the second journal portion has a second inner diameter that is larger than the first inner diameter;

installing the third race on a third journal portion disposed between the second journal portion and the front side, and the third journal portion has a third inner diameter that is larger than the second inner diameter;

inserting fourth, fifth and sixth races into the stepped bore from the rear side of the engine body;

installing the fourth race on a fourth journal portion disposed proximal to the central position axially along the stepped bore between the first journal portion and the rear side, and the fourth journal portion has a fourth inner diameter equal to the first inner diameter;

installing the fifth race on a fifth journal portion disposed between the fourth journal portion and the rear side, and the fifth journal portion has a fifth inner diameter that is larger than the fourth inner diameter and equal to the second inner diameter; and installing the sixth race on a sixth journal portion disposed between the fifth journal portion and the rear side, and the sixth journal portion has a sixth inner diameter that is larger than the fifth inner diameter and equal to the third inner diameter;

wherein the first and fourth races have an equal thickness, the second and fifth races have an equal thickness greater than that of the first and fourth races, and the third and sixth races have an equal thickness greater than that of the second and fifth races.

19. The method of claim 17, further comprising:

inserting a first, second, third, fourth, fifth and sixth races into the stepped bore from one of the front and rear sides of the engine body;

installing the first race on a first journal portion that has a first inner diameter and is disposed proximal to the other of the front and rear sides;

installing the second race on a second journal portion disposed between the first journal portion and the other of the front and rear sides, and the second journal portion has a second inner diameter that is larger than the first inner diameter; and installing the third race on a third journal portion disposed between the second journal portion and the other of the front and rear sides, and the third journal portion has a third inner diameter that is larger than the second inner diameter;

installing the fourth race on a fourth journal portion disposed between the third journal position and the other of the front and rear sides, and the fourth journal portion has a fourth inner diameter larger than the third inner diameter;

installing the fifth race on a fifth journal portion disposed between the fourth journal portion and the other of the front and rear sides, and the fifth journal portion has a fifth inner diameter that is larger than the fourth inner diameter; and installing the sixth race on a sixth journal portion disposed between the fifth journal portion and the other of the front and rear sides, and the sixth journal portion has a sixth inner diameter that is larger than the fifth inner diameter.

* * * * *

UNITED STATES PATENT AND TRADEMARK OFFICE
CERTIFICATE OF CORRECTION

| | | |
|---|---|---|
| PATENT NO. | : 8,887,682 B2 | Page 1 of 1 |
| APPLICATION NO. | : 13/711075 | |
| DATED | : November 18, 2014 | |
| INVENTOR(S) | : Brodbeck | |

It is certified that error appears in the above-identified patent and that said Letters Patent is hereby corrected as shown below:

On the Title page:

In Item (12) under United States Patent, please change "Brodeck" to "Brodbeck". And in the Applicant's name, please change "Internartional" to "International". Please also change "Brodeck" to "Brodbeck" in the Inventor's name.

Signed and Sealed this
Second Day of June, 2015

Michelle K. Lee
*Director of the United States Patent and Trademark Office*